United States Patent [19]

Stern et al.

[11] 4,357,108

[45] Nov. 2, 1982

[54] METHOD FOR REPRODUCTON OF OBJECT SURFACES

[75] Inventors: Howard K. Stern, Greenlawn; Joseph A. Ross, Fort Salonga; Paul Di Matteo, Huntington, all of N.Y.

[73] Assignee: Robotic Vision Systems, Inc., Melville, N.Y.

[21] Appl. No.: 157,030

[22] Filed: Jun. 6, 1980

[51] Int. Cl.³ .............................................. G01B 11/00
[52] U.S. Cl. ......................................... 356/376; 356/2
[58] Field of Search ....................... 356/2, 375, 376, 1; 250/558

[56] References Cited

U.S. PATENT DOCUMENTS

| | | | |
|---|---|---|---|
| 3,633,010 | 1/1972 | Svetlichny | 356/1 |
| 3,866,052 | 2/1975 | Di Matteo et al. | 356/2 |
| 3,918,816 | 11/1975 | Foster et al. | 356/1 |
| 4,145,991 | 3/1979 | Di Matteo et al. | 356/375 |
| 4,259,589 | 3/1981 | Di Matteo et al. | 356/2 |

*Primary Examiner*—R. A. Rosenberger

[57] ABSTRACT

A method for reproducing an object surface wherein a time succession of spatially encoded different radiant energy patterns are projected at the object surface and records are made of the object surface during such projections from two or more spatially separated locations. The sets of records recorded at the separate spatial locations are then utilized to determine the spatial points on the object surface.

8 Claims, 6 Drawing Figures

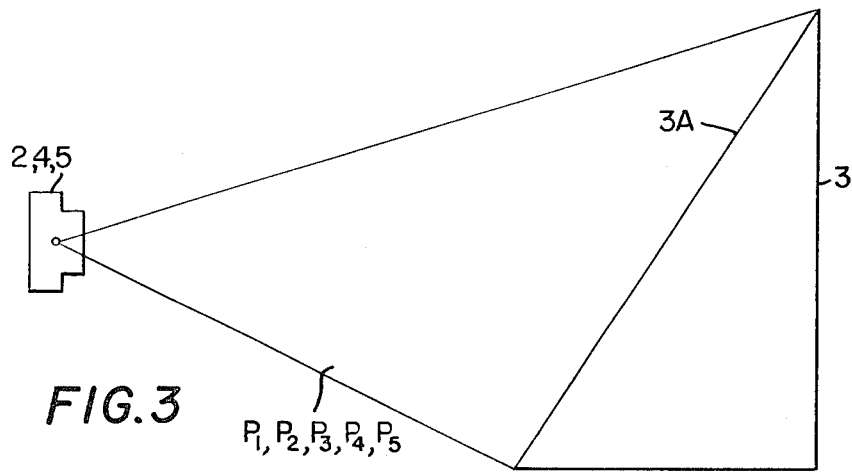
FIG.3
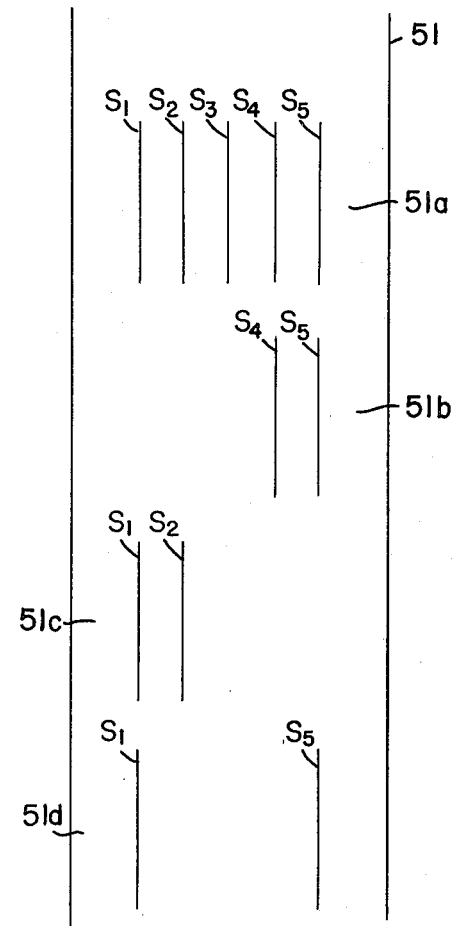
FIG.4
FIG.5

METHOD FOR REPRODUCTON OF OBJECT SURFACES

BACKGROUND OF THE INVENTION

This invention relates to a practice for determining the spatial location of the points on an object surface and, in particular, to a practice utilizing photographic two-dimensional records for generating three-dimensional information for defining object surface points.

Various techniques have been developed for three-dimensional reproduction of object surfaces. In one technique, referred to as photogrammetry, records of the object surface are simultaneously made by two spatially separated cameras of known location. These records are then examined to identify the corresponding points in each record representing a particular object feature. With this information and the known information regarding the locations and magnifications of the cameras, the spatial location of the particular object feature can be determined by simple triangulation. This prodedure is then repeated for other recorded object features until substantial reproduction of the object surface is at hand.

Photogrammetry is advantageous in situations where object motion is encountered, since the records of the bject can be made instantaneously and, therefore, are not affected by object motion. Typically, such instantaneous recording is carried out by utilizing a high speed strobe light to illuminate the object or, conversely, by using continuous illumination with cameras enabled by high speed synchronized shutters.

The aforesaid benefits of the photogrammetric procedure are, however, countered by the extremely long time that it takes to complete the operation. This, in turn, is due to the need to determine corresponding record points representative of the same object feature. Furthermore, in many situations, the degree of unique surface detail is limited, as in the case of a smooth surface, making it extremely difficult, if not impossible, to recognize features either by operator identification or by computer correlation of record points corresponding to object features.

Another technique developed for three dimensional reproduction eliminates the need for a lengthy recognition procedure. In this practice, as is disclosed in U.S. Pat. No. 3,866,052, assigned to the same assignee hereof, spatially encoded radiation patterns are projected at the object in time succession and records are made at the time of each such projection. These records may be used to determine for each recorded surface point a unique area corresponding to a particular area of illumination (i.e., a unique group of records) which corresponds in turn to a particular small surface area or feature of the object. Correlation of record points with corresponding object features is thus through coding and the need for operator identification and/or computer correlation via feature shape is thereby eliminated. In this case, the recorded object points and the known projector and camera orientations and locations can be used with the geometric triangulation procedure to arrive at the spatial location of the object surface points. For example, when the spatially encoded radiant energy patterns approach a planar form, each surface point can be found by the intersection of a particular camera ray corresponding to a particular recorded point with a particular projected planar pattern. Similarly, when each of the encoded patterns approximates an illuminating ray, each particular surface point is found by the intersection of a particular camera ray and a particular illuminating ray.

While the projection of a succession of encoded radiant energy patterns eliminates the need for a time consuming record investigation, the making of the records in this case is not instantaneous, due to film transport time, scan time, etc. As a result, any motion of the object during recording scrambles or confuses the recorded object surface information, making it difficult to reproduce therefrom the object surface.

It is therefore an object of the present invention to provide a method of three dimensional surface reproduction which is both rapid and substantially insensitive to object motion.

SUMMARY OF THE INVENTION

In accordance with the principles of the present invention, the above and other objectives are realized in a practice wherein a time succession of spatially encoded different radiant energy patterns are projected at an object surface and records are made of the object surface during such projections from two or more spatially separated locations. The sets of records recorded at the spaced locations are then utilized to determine the spatial points on the object surface.

More particularly, the spatial succession of encoded patterns together define a set of irradiated surface portions or sections and enable unique identification of the recorded images of these sections based on the sets of records in which these images appear. Images corresponding to the same surface section will appear in a unique set of corresponding records (i.e., records made at the same time at the separate locations). As a result, corresponding images in the two sets of records made at the separate locations can be accurately determined merely by identifying an image in one of the sets of records and the particular group of records of the one set in which that image appears and then identifying the image in the other set of records which appears exclusively in the group of records of the other set made at the same time as the identified group of the one set. Application of the triangulation procedure to the identified corresponding images then allows determination of the spatial location of the surface points in the related object surface section.

In preferred practice in accordance with the method of the invention, the encoded patterns are rapidly projected in succession with the patterns of highest frequency being the first projected. These patterns result in irradiation of all the sections of the object surface and the images in the records made during this projection are those used to determine the surface point locations. Subsequent projection of the remaining encoded patterns all of lesser spatial frequency and the records made therefrom provide the additional information for accurately determining corresponding images in the initial records, which images can then be used to assess the locations of the object points by triangulation.

BRIEF DESCRIPTION OF THE DRAWINGS

The above and other features and aspects of the present invention will become more apparent upon reading the following detailed description in conjunction with the accompanying drawings, in which:

FIGS. 1-3 illustrate plan, front and side views of apparatus for carrying out the method of the present invention;

FIG. 4 shows a table defining a particular set of encoded radiant energy patterns used in conjunction with apparatus of FIGS. 1-3;

FIG. 5 illustrates a mask for realizing the patterns of FIG. 4; and

DETAILED DESCRIPTION

Figure 1:
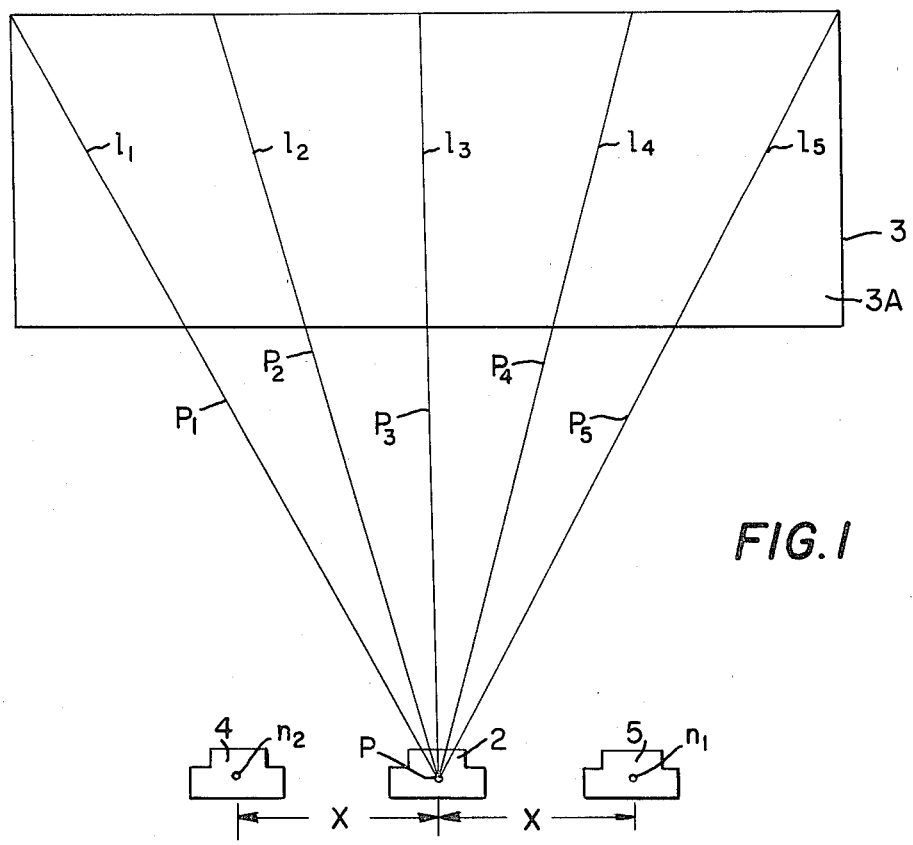
Figure 2:
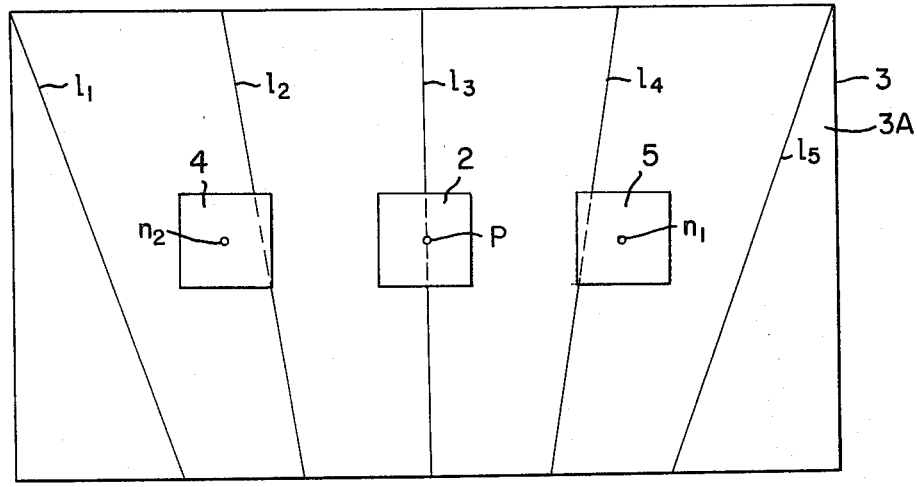

FIGS. 1-3 shows apparatus 1 for three dimensional spatial reproduction in accordance with the principles of the present invention. A projector 2 projects from a projection point P radiant energy outward onto an object 3 which, for present illustrative purposes, is assumed to be wedge shaped. The projected energy is confronted by the slanting surface 3A of the object, this surface being in facing relation to the projector and being the surface to be reproduced by operation of the apparatus 1.

In accordance with the invention, energy projected by the projector 2 occurs in a succession of encoded radiant energy patterns. In the present case of FIG. 1, each encoded pattern comprises one or more of a set of substantially planar energy beams; this set of beams being shown as five beams $P_1$ through $P_5$ of equal divergence originating from the projection point P.

In the preferred practice of the invention, the first encoded pattern of planar beams to be projected, designated pattern A, includes the total set of beams, (i.e., beams $P_1$ through $P_5$). This is indicated by the chart in FIG. 4 which lists the encoded patterns and identifies whether or not the planes $P_1$ to $P_5$ are in those patterns. In FIG. 4, the presence of a plane is indicated by a 1 and the absence thereof by a 0. As above-noted, the encoded pattern A comprises the five planes $P_1$ through $P_5$ and, therefore, under pattern A is listed a 1 adjacent each of the planes $P_1$ through $P_5$ indicating their presence in the pattern.

The remaining succession of encoded patterns projected by the projector 2 contain lesser of the planes $P_1$ through $P_5$. As can be seen from FIG. 4, three further such patterns are projected in succession after the pattern A, these further patterns being designated as patterns B through D. Pattern B provides projection of the planes $P_4$ and $P_5$ only and thus there is listed under pattern B a 0 adjacent the planes $P_1$ through $P_3$ and a 1 adjacent planes $P_4$ and $P_5$. Pattern C on the other hand projects planes $P_1$ and $P_2$ only and, hence, under this pattern a 1 is adjacent the latter planes and a 0 adjacent planes $P_3$ through $P_5$. Finally, under pattern D, a 1 is listed adjacent planes $P_1$ and $P_5$ indicating projection of same and a 0 adjacent patterns $P_2$ through $P_4$.

FIG. 5 shows a mask 51 useable in the projector 2 for realizing successive projections in accordance with the encoded patterns A-D. The mask 51 contains 4 slit configurations 51a through 51d, the first configuration containing five slits $S_1$ through $S_5$ for generating the pattern A, the second configuration containing the slits $S_4$ and $S_5$ for generating the pattern B, the third configuration containing the slits $S_1$ and $S_2$ for generating the pattern C and the fourth configuration containing the slits $S_1$ and $S_5$ for generating the pattern D.

In actual practice, the first slit configuration is set in the projector 2 and a strobe light is actuated, thereby resulting in the projection of planes $P_1$ through $P_5$ which confront the surface 3A along the confrontation lines $l_1$ through $l_5$. The remaining configurations are then rapidly moved in succession through the projector with subsequent strobe light actuation resulting in the following sequence of plane projections and corresponding line confrontations: $(P_4,P_5)$ $(l_4,l_5)$; $(P_1,P_2)$ $(l_1,l_2)$; $(P_1,P_5)$ $(l_1,l_5)$.

During each of the successive radiant energy projections, records are made of the confrontations of the radiant energy planes with the object surface 3A (i.e., lines $l_1$ through $l_5$) by two cameras 4 and 5 located at spatially separate positions. As shown, the cameras are arranged on opposite sides of the projector 2 with their lens nodes $n_1$ and $n_2$ in horizontal and vertical alignment with the projection point P and equally spaced therefrom by the measure X. This arrangement is shown for ease of illustration, and horizontal and vertical alignment is not required for practice of the invention.

As mentioned above, projection of the pattern A results in all the planes $P_1$ through $P_5$ being projected and, thus, illumination of all the regions or sections of the object surface to be investigated. These illuminated regions in the present case correspond to the confrontation lines $l_1$ through $l_5$ and are recorded by the cameras 4 and 5 in records 61 and 61' of FIG. 6 as respective images $i_1$ through $i_5$ and $i_1'$ through $i_5'$. It is noted that in the record depictions in FIG. 6, the camera reversal has been removed for clarity of presentation.

The records 61 and 61' made by the cameras 4 and 5 due to the use of strobe illumination are relatively insensitive to object motion. This is ensured by making the illumination time instantaneous, which for the present purposes, is assumed to mean relatively short in time with respect to expected speed of motion of the object (typical strobe times might be 10 microseconds). Object movement during recordation is thus limited to only a fraction of the projected plane width and as a result, the records are substantially unspoiled by such movement. The records 61 and 61' thus offer a reliable means, at least with regard to object motion, for determining the spatial location of the object surface points along the confrontation lines $l_1$ through $l_5$.

Determination of such surface points, however, requires that corresponding images representative of the same confrontation lines in the two records be ascertained. Thus, the image $i_1$ must be recognized as corresponding to the image $i_1'$, the image $i_2$ as corresponding to the $i_2'$, etc. Once corresponding images are found, these images can then be used in conjunction with the known camera lens node locations to determine by customary triangulation, the spatial location of the points of the associated confrontation line.

Figure 6:
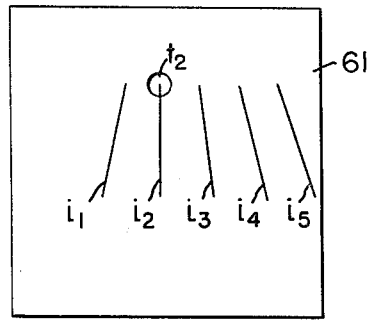
FIG. 6 shows records made with the patterns of FIG. 4.
Figure 6:
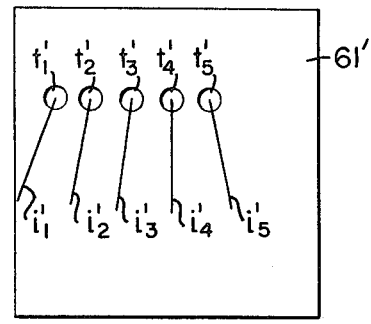
Figure 6:
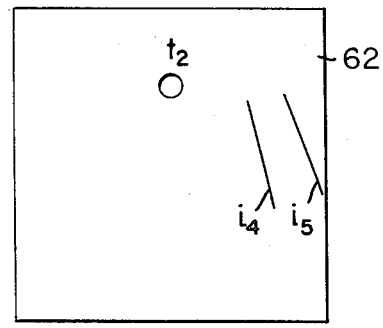
Figure 6:
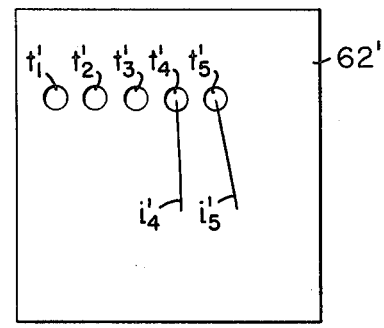
Figure 6:
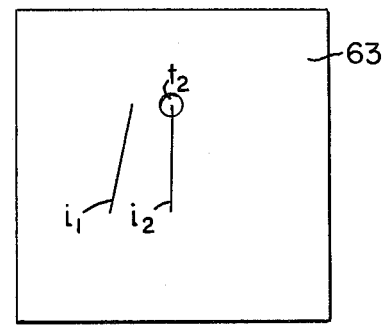
Figure 6:
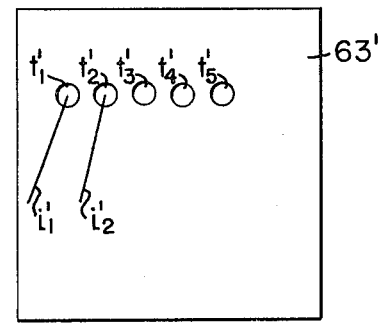
Figure 6:
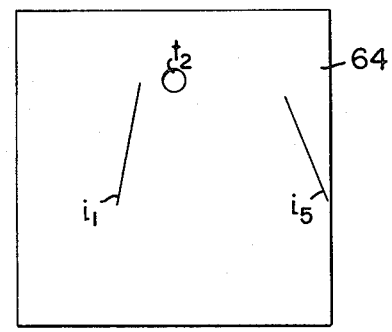
Figure 6:
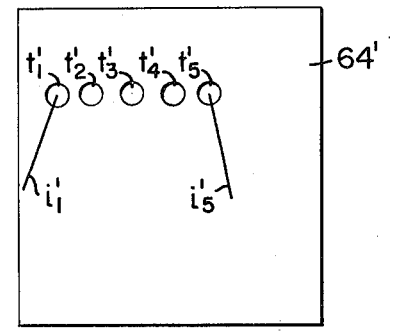

In accordance with the invention, the identification of corresponding images in the records 61 and 61' is facilitated by utilizing the additional records made by the cameras 4 and 5 during the remaining succession of radiant energy projections, i.e., during the projection patterns B through D; these records being shown in FIG. 6, respectively, as 62, 62', 63, 63', 64, and 64'. In particular, due to the patterns A-D being differently encoded, they define for each image of plane and object confrontation (i.e., a particular confrontation line) a unique group of records made with the camera 4 and a corresponding unique group of records made with the camera 5 (these records are those made simultaneously with those of the unique group of camera 4 records) in which that image will appear. This can be seen from FIG. 4 wherein it is apparent that the confrontation line $l_1$ and, therefore, its recorded image, will appear only in the records made with the cameras 4 and 5 during projection of the patterns A,C,D. Similarly, images of the confrontation lines $l_2, l_3, l_4$, and $l_5$ will appear only in the corresponding records made during projection of the patterns (A,C), A, (A,B), and (A,B,D), respectively.

Corresponding images (i.e., images of the same confrontation line in the records made at the same time by the cameras 4 and 5) will then appear only in the respective unique camera 4 and unique camera 5 groups of records defined for such images. Corresponding images of the confrontation line $l_1$ will thus appear in the unique camera 4 records (61, 63, 64) and in the unique camera 5 records (61', 63', 64'). Similarly, corresponding images of the lines $l_2$ through $l_5$ will appear in the following unique camera 4 and camera 5 record groups: (61,63) and (61',63') for the line $l_2$; (61) and (61') for the line $l_3$; (61,62) and (61',62') for the line $l_4$; and (61,62,64) and (61',62'64') for the line $l_5$.

In order to determine which of the image lines $i_1'$ to $i_5'$ in the record 61' corresponds to a particular one of the image lines $i_1$ to $i_5$ in the record 61', it therefore is only necessary with the present method to determine which of the image lines $i_1'$ to $i_5'$ appears exclusively in those records of the camera 5 made simultaneously with the records of the camera 4 containing the particular line. Thus, the image line $i_1$ appears in the records 61, 63 and 64 so that its corresponding image line should be one that appears exclusively in the records 61', 63' and 64'. Similarly, the image lines $i_2$ through $i_5$ appear in records (61,63); (61); (61,62); and (61, 62, 64) so that their corresponding image lines should be lines which appear exclusively in records (61',63'); (61'); (61',62'); and (61',62',64'), respectively.

In the present illustrative case, it is apparent from observing the records that image lines $i_1$ through $i_5$ correspond, respectively, to image lines $i_1'$ through $i_5'$. Thus, utilizing these corresponding lines in the triangulation procedure will accurately locate the spatial positions of the points of the confrontation lines $l_1$ through $l_5$.

The above procedure of assessing corresponding image lines in the records of the cameras 4 and 5 can be advantageously performed merely by comparing test regions of limited extent encompassing sections of the image lines, rather than comparing entire image lines. By use of such regions account is taken for any minor displacement that might occur in the image lines due to object motion during the record making procedure. In practice, the test region should be large enough to encompass expected displacement, but not so large as to cause confusion of adjacent image lines. Furthermore, each test region on the record 61 occupies the same record location on the records 62 through 64. Similarly, each test region on record 61' will appear at the same location on the records 62' through 64'.

FIG. 6 shows a test region $t_2$ associated with the image line $i_2$. As can be observed, the test region $t_2$ encompasses an $i_2$ image line portion in the records 61 and 63 and no such portion in the records 62 and 64, indicating exclusivity of the image line $i_2$ in the former records. Likewise, a corresponding test region $t_2'$ encompasses $i_2'$ image line portions only in the corresponding records 61' and 63' (i.e., the test region $t_2'$ encompasses no $i_2'$ image line portions in records 62' and 64'. Moreover, the further test regions $t_1', t_3', t_4'$ and $t_5'$ for the lines $i_1', i_3', i_4'$, and $i_5'$ do not encompass line portions exclusively in both the aforesaid corresponding records. Hence, the records indicate that image line $i_2$ corresponds to the image line $i_2'$ and not to lines $i_1', i_3', i_4'$ and $i_5'$.

The process of comparing the image lines in the records of the cameras 4 and 5 can be carried out by an operator viewing the records or via scanning of the records to generate electrical signals which can be processed by a computer. Conventional scanning equipment for accomplishing this may be of the type disclosed in the above-mentioned U.S. patent.

While evaluation of the records 61 and 61' to derive the confrontation lines $l_1$ through $l_5$ has been discussed in terms of identifying which projected plane (or ray) generated the individual spatial points on the lines, the present method is adaptable for use in an automatic contour line mode of operation. In this mode of operation, the image lines for a particular confrontation line in the records of the camera 4 are utilized to generate a spatial surface by employing a computer to graphically project rays from the image points through the lens node of camera 4. This surface passes through the respective confrontation line to be determined. An analogous procedure is followed for the corresponding image lines in the records of the camera 5, this time the graphic projection being through the lens node of camera 5 and resulting in a surface which also passes through the confrontation line. Determination of the line defined by intersection of the two projected surfaces will then be the desired confrontation line. Thus, with this technique, the confrontation lines can be generated automatically without knowledge of the projector 2 position.

It should be noted that the coding of the different radiant energy patterns can take on any number of conventional forms as long as the patterns enable the generation of records which uniquely define the various object sections collectively defined by the patterns. It should also be noted that the patterns can be such as to result in other than planar beams emanating from a single point. Thus, parallel planar beams can be used, as well as beams having other than a substantially planar form, such as individual coded rays formed by orthogonal coded sets of planes or coded concentric circular projections for use in a cylindrical coordinate system, etc.

As above-discussed, practice of the present invention utilizing the projected beams $P_1$ through $P_5$ enables determination of the locations of the points on the object 3 along the confrontation lines $l_1$ through $l_5$. In order to reproduce the entire object surface, the practice is repeated with different sets of beam patterns until the sets of patterns have encompassed the total expanse of the object surface.

Before utilizing the additional records 62–64 and 62'–64' to ascertain the corresponding images in the records 61 and 61' as discussed above, an initial evaluation procedure is contemplated in accordance with the invention, this initial procedure involving determination of corresponding image lines by feature evaluation and a subsequent assessment of the correctness of each such determination. In particular, this initial procedure is practiced by first examining features of the image lines of the records 61 and 61', either through an operator or automatically, and then utilizing similarly recognized features to make a determination of which image lines in the two records correspond to one another. Once corresponding lines have been determined, these lines are used with the known camera lens node locations to determine by customary triangulation, the related confrontation lines.

Having determined these confrontation lines, the lines are then evaluated as to whether they are situated in any one of the planar beams projected by the projector 2. If a determined confrontation line is not in any of the beams, this indicates that the image lines used to generate the confrontation line are not corresponding image lines. If on the other hand, the determined confrontation line is in one of the projected beams this indicates that the image lines used to generate the confrontation line might be corresponding image lines. Hence, this procedure provides information as to which lines of the records 61 and 61' selected as corresponding are, in fact, not corresponding and further which lines have a liklihood of being corresponding. Subsequent use of the remaining records, as above-described, provides a definite evaluation as to whether the selected lines are corresponding.

In all cases, it is understood that the above-described arrangements are merely illustrative of the many possible specific embodiments which represent applications of the present invention. Numerous and varied other arrangements, including arrangements utilizing planes formed by the subtraction of projections as described in the aforementioned U.S. Pat. No. 3,866,052, can readily be devised in accordance with the principles of the present invention without departing from the spirit and scope of the invention.

What is claimed is:

1. A method for use in determining the spatial location of the points on the surface of an object comprising the steps of:
   sequentially projecting in rapid succession different radiant energy patterns onto the object surface;
   making separate records from a first location of the irradiated object surface during said sequence of projections;
   making separate records from a second location displaced from said first location of the irradiated object surface during said sequence of projections;
   and utilizing said records made at said first and second locations to spatially locate points on said object surface, said step of utilizing comprising:
      identifying a first set of points all of which appear in each of a first group of said records made at said first location and none of which appear in any other records made at said first location;
      identifying a second set of points all of which appear in each of a second group of records made at said second location, said second group of records being made during the making of said first group of records;
      and determining the spatial location of points on said object surface with said first and second sets of points.

2. A method for use in determining the spatial location of the points on the surface of an object comprising the steps of:
   sequentially projecting in rapid succession different radiant energy patterns onto the object surface, each of said energy patterns enabling one or more radiant energy beams to be projected;
   making separate records from a first location of the irradiated object surface during said sequence of projections;
   making separate records from a second location displaced from said first location of the irradiated object surface during said sequence of projections;
   each of said records made at said first and second locations including an image of the confrontation of the object surface with each of the radiant energy beams projected during the making of that record;
   and utilizing said records made at said first and second locations to spatially locate points on said object surface, said step of utilizing comprising:
      identifying a first group of records, said first group of records being all the records made at said first location in which an image of the confrontation of a particular beam with the object surface appears;
      identifying a second group of records, said second group of records being those made at said second location at the same time as said first group of records were made;
      identifying an image which appears in all said second group of records;
      and determining the spatial location of the confrontation of said particular beam and said object surface with said image that appears in all said first records and with said image which appears in all said second records.

3. A method in accordance with claim 2 wherein:
one of said radiant energy patterns enables a greater number of beams to be projected and the remaining patterns enable a lesser number of beams to be projected.

4. A method in accordance with claim 3 wherein:
said one pattern is the first to be projected.

5. A method in accordance with claim 4 wherein:
the images used for determining the spatial location of said confrontation are those in the records made at the first and second locations during the projection of said one radiant energy pattern.

6. A method in accordance with claim 5 wherein:
each of said radiant energy beams is planar in form.

7. A method in accordance with claim 6 wherein:
said radiant energy beams emanate from a common projection point and diverge therefrom.

8. A method in accordance with claim 2 wherein:
said step of utilizing comprises:
   determining from records made at said separate locations points which may correspond; utilizing said points to determine the spatial location of a point on said object; and determining whether said determined object point lies in any one of said radiant energy beams.

* * * * *